(12) United States Patent
Höglund

(10) Patent No.: US 11,044,700 B2
(45) Date of Patent: Jun. 22, 2021

(54) NON-ANCHOR CARRIER CONFIGURATION FOR NB-IOT

(71) Applicant: Telefonaktiebolaget LM Ericsson (publ), Stockholm (SE)

(72) Inventor: Andreas Höglund, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 16/482,768

(22) PCT Filed: Jan. 31, 2018

(86) PCT No.: PCT/IB2018/050612
§ 371 (c)(1),
(2) Date: Aug. 1, 2019

(87) PCT Pub. No.: WO2018/142306
PCT Pub. Date: Aug. 9, 2018

(65) Prior Publication Data
US 2019/0357175 A1    Nov. 21, 2019

Related U.S. Application Data

(60) Provisional application No. 62/454,714, filed on Feb. 3, 2017.

(51) Int. Cl.
*H04W 4/00* (2018.01)
*H04W 72/00* (2009.01)
(Continued)

(52) U.S. Cl.
CPC ........... *H04W 72/005* (2013.01); *H04W 4/80* (2018.02); *H04W 24/08* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2017/0251443 A1* 8/2017 Shin ................... H04L 5/0098
2018/0020432 A1* 1/2018 Rico Alvarino .... H04W 72/048
(Continued)

OTHER PUBLICATIONS

3GPP TSG-RAN WG2 Meeting#95, Consideration for PRACH on multi-carrier in NB-IoT, Aug. 22-26, 2016, R2-164859 (Year: 2016).*
(Continued)

*Primary Examiner* — Siren Wei
(74) *Attorney, Agent, or Firm* — Baker Botts, LLP

(57) ABSTRACT

According to some embodiments, a method in a network node comprises broadcasting configuration information comprising: an absolute radio frequency channel number (ARFCN) identifying a frequency position of a first carrier, and an index identifying a frequency position of a second carrier relative to the ARFCN of the first carrier. The method further comprises paging a wireless device using the second carrier. A method in a wireless device comprises: receiving the broadcasted configuration information; determining the frequency position of the second carrier using the frequency position of the first carrier and the index of the second carrier; and monitoring the second carrier for paging information. The wireless device may comprise a narrowband Internet-of-Things (NB-IoT) device, the first carrier may comprise a NB-IoT anchor carrier, and the second carrier may comprise a NB-IoT non-anchor carrier.

26 Claims, 6 Drawing Sheets

300

312 - broadcast configuration information comprising: an ARFCN identifying a frequency position of a first carrier; and an index identifying a frequency position of a second carrier 314 - page a wireless device using the second carrier

(51) Int. Cl.
    *H04W 4/80*    (2018.01)
    *H04W 76/27*   (2018.01)
    *H04W 24/08*   (2009.01)
    *H04W 68/00*   (2009.01)
    *H04W 72/04*   (2009.01)

(52) U.S. Cl.
    CPC ..... *H04W 68/005* (2013.01); *H04W 72/0453* (2013.01); *H04W 76/27* (2018.02)

(56) References Cited

U.S. PATENT DOCUMENTS

2018/0287845 A1* 10/2018 Kim ................. H04L 5/0053
2019/0007884 A1*  1/2019 Koskinen ........... H04W 28/20
2019/0246371 A1*  8/2019 Hwang ............... H04W 4/80

OTHER PUBLICATIONS

3GPP TSG RAN WG1 NB-IoT Ad-Hoc Meeting; Sophia Antipolis, France; Source: Ericsson; Title: NB-IoT—Remaining issues for NPBCH and MIB—Mar. 22-24, 2016.

3GPP TSG-RAN WG2 #93bis; Dubrovnik, Croatia; Source: Ericsson; Title: UE Reconfiguration to a Non-Anchor Carrier in NB-IoT (Tdoc R2-162769)—Apr. 11-15, 2016.

3GPP TSG-RAN WG2 Meeting #95; Gothenburg, Sweden; Source: ZTE; Title: Consideration for PRACH on multi-carrier in NB-IoT (R2-164859)—Aug. 22-26, 2016.

3GPP TSG-RAN WG2 #96; Reno, Nevada; Source: Ericsson; Title: Text proposal for non-anchor carrier configuration (Tdoc R2-167623)—Nov. 14-18, 2016.

PCT International Search Report for International application No. PCT/IB2018/050612—dated May 8, 2018.

PCT Written Opinion of the International Searching Authority for International application No. PCT/IB2018/050612—dated May 8, 2018.

* cited by examiner

NON-ANCHOR CARRIER CONFIGURATION FOR NB-IOT

PRIORITY

This nonprovisional application is a U.S. National Stage Filing under 35 U.S.C. § 371 of International Patent Application Serial No. PCT/IB2018/050612 filed Jan. 31, 2018 and entitled "Non-Anchor Carrier Configuration for NB-IOT" which claims priority to U.S. Provisional Patent Application No. 62/454,714 filed Feb. 3, 2017 both of which are hereby incorporated by reference in their entirety.

TECHNICAL FIELD

Particular embodiments are directed to wireless communications and, more particularly, to physical resource block (PRB) index configuration for non-anchor carrier configuration for narrowband Internet-of-Things (NB-IoT) and multi-PRB operation.

BACKGROUND

Third Generation Partnership Project (3GPP) includes Narrowband Internet of Things (NB-IoT), which is a narrowband system developed for cellular internet of things. The system is based on existing LTE systems, and addresses optimized network architecture and improved indoor coverage for massive number of devices with the following characteristics: (a) low throughput devices (e.g., 2 kbps); (b) low delay sensitivity (e.g., ~10 seconds); (c) ultra-low device cost (e.g., below 5 dollars); and (d) low device power consumption (e.g., battery life of 10 years).

Each cell (~1 km$^2$) in the system can serve thousands (~50 thousand) of devices, such as sensors, meters, actuators, and other devices. To use existing spectrum (e.g., GSM), a fairly narrow bandwidth (e.g., 180 kHz bandwidth, which may be similar to the long term evolution (LTE) physical resource block (PRB)) has been adopted for NB-IoT technology. The entire NB-IoT can be contained within 200 kHz, or one PRB, which may be 12 subcarriers of 15 kHz each (in NB-IoT this is referred to as one carrier or one PRB).

For a frequency division duplex (FDD) mode of NB-IoT (e.g., the transmitter and the receiver operate at different carrier frequencies), only a half-duplex mode may need to be supported in the user equipment (UE). To achieve improved coverage, data repetition can be used both in the uplink (UL) and/or downlink (DL). The lower complexity of the devices (e.g., only one transmission/receiver chain) means that some repetition might be needed also in normal coverage.

Further, to alleviate UE complexity, cross-subframe scheduling may be used. A transmission is first scheduled on a narrowband physical downlink control channel (NPDCCH) and then the first transmission of the actual data on the narrowband physical downlink shared channel (NPDSCH) is carried out after the final transmission of the NPDCCH. Similarly, for uplink data transmission, information about resources scheduled by the network (NW) and needed by the UE for uplink transmission is first conveyed on the NPDCCH and then the first transmission of the actual data by the UE on the narrowband physical uplink shared channel (NPUSCH) is carried out after the final transmission of the NPDCCH. In other words, for both cases above, there may be no simultaneous reception of control channel and reception/transmission of data channel from the UE's perspective.

Furthermore, not all the subframes may be available for dedicated data communication in downlink in an NB-IoT cell. The amount of available subframes in the downlink may depend on one of the three operation modes (e.g., Stand-alone, In-band, and Guard-band) for NB-IoT.

For all operation modes, a UE may need to rate-match around the following non-available subframes (or parts of subframe): (a) the NB-IoT primary and secondary synchronization channels (NPSS, NSSS), where NPSS is transmitted every radio frame (NB-IoT radio frame length is the same as in LTE; e.g., 10 ms and consists of 10 subframes; NPSS is transmitted in subframe number 5; NSSS transmission cycle is not yet defined in 3GPP); (b) the NB-IoT broadcast channel (NPBCH) containing the Master Information Block (MIB) occupying subframe 0 in every radio frame; (c) the NB-IoT system information blocks broadcast on NPDSCH (e.g., NSIB1 broadcast in 4th subframe of every other radio frame); (d) downlink gaps when configured; and (e) NB-IoT reference symbols (NRS). For in-band operation mode, the UE may need to rate-match around LTE reference symbols such as Cell Reference Symbols (CRS) and PRS, and LTE Multimedia Broadcast Single Frequency network (MBSFN) subframes.

Because of NB-IoT properties such as half-duplex communication, cross-subframe scheduling, low bandwidth, the available amount of subframes, and the amount of UEs to be served, it is evident that, as with many other communication systems, that NB-IoT may benefit by using more spectrum for efficient operation, especially if such spectrum is already available (e.g., in an in-band operation mode during low traffic hours when LTE carrier is not fully used). Therefore, in 3GPP Rel-13, NB-IoT multi-carrier operation includes a UE operating in an NB-IoT anchor carrier that is configured through higher layer signaling (e.g., Layer 3 RRC) to operate in an NB-IoT non-anchor carrier during connected mode operation. The non-anchor carrier does not have to be deployed on the 100-kHz raster (e.g., any LTE in-band PRB can be used as a non-anchor). At the end of connected mode operation, the UE can autonomously return back to the anchor carrier.

LTE Rel-14 may extend multi-carrier operation, and unlike Rel-13 operation, UEs may both monitor paging and perform Random Access on non-anchor carriers. In Rel-13, only UEs in RRC Connected Mode operate on the non-anchor carrier, and the non-anchor configuration is provided by RRC dedicated signaling. Because a Rel-14 UE in RRC Idle Mode can operate on non-anchor carriers (RA and paging), the configuration must instead be provided by common signaling. A network may broadcast the non-anchor configurations in a new system information block (SIB).

A problem with providing all the non-anchor configurations in a SIB is that the SIB can become too large for UEs to handle. NB-IoT UEs may only be able to support a downlink transport block size of up to 680 bits (e.g., Cat-N1, Rel-14 Cat-N2 may support more). The information elements (IEs) used for the dedicated non-anchor carrier configuration in Rel-13 can be used in the Rel-14 common configuration, and thus included in the new SIB. For downlink, for example, only the IE CarrierFreq-NB-r13 and DL-Bitmap-NB-r13 can be 23+40=63 bits. And the maximum number on configurable downlink non-anchor carriers is 16. Thus, the new SIB can be larger than 1008 bits, which may be a problem.

The alternatives described in the Background section are not necessarily alternatives that have been previously conceived or pursued. Therefore, unless otherwise indicated herein, the alternatives described in the Background section are not prior art and are not admitted to be prior art by inclusion in the Background section.

SUMMARY

Particular embodiments described herein configure non-anchor carriers without using full frequency position information (i.e., CarrierFreq-NB-r13 containing the E-ARFCN plus offset), and use the user equipment's knowledge of the frequency position of the anchor carrier such that the non-anchor carriers can be configured using a smaller physical resource block (PRB)-index.

According to some embodiments, a method in a network node in a wireless communication system comprises broadcasting configuration information comprising an absolute radio frequency channel number (ARFCN) identifying a frequency position of a first carrier, and an index identifying a frequency position of a second carrier relative to the ARFCN of the first carrier. The method further comprises paging a wireless device using the second carrier.

According to some embodiments, a network node comprises processing circuitry. The processing circuitry is operable to broadcast configuration information comprising an ARFCN identifying a frequency position of a first carrier, and an index identifying a frequency position of a second carrier. The processing circuitry is further operable to page a wireless device using the second carrier.

In particular embodiments, the wireless device comprises a narrowband Internet-of-Things (NB-IoT) device, the first carrier comprises a NB-IoT anchor carrier, and the second carrier comprises a NB-IoT non-anchor carrier. The wireless device may be in radio resource control (RRC) idle mode. The configuration information may comprise system information.

In particular embodiments, the index comprises a PRB index. The PRB index may comprises an absolute PRB index (e.g., integers in a range from −5 to 104). The PRB index may comprises a PRB index relative to the first carrier. The index may include guard band carriers.

According to some embodiments, a method in a wireless device in a wireless communication system comprises receiving configuration information comprising an ARFCN identifying a frequency position of a first carrier, and an index identifying a frequency position of a second carrier relative to the ARFCN of the first carrier. The method further comprises determining the frequency position of the second carrier using the frequency position of the first carrier and the index of the second carrier; and monitoring the second carrier for paging information.

According to some embodiments, a wireless device comprises processing circuitry. The processing circuitry is operable to receive configuration information comprising an ARFCN identifying a frequency position of a first carrier, and an index identifying a frequency position of a second carrier relative to the ARFCN of the first carrier. The processing circuitry is further operable to: determine the frequency position of the second carrier using the frequency position of the first carrier and the index of the second carrier; and monitor the second carrier for paging information.

In particular embodiments, the wireless device comprises a NB-IoT device, the first carrier comprises a NB-IoT anchor carrier, and the second carrier comprises a NB-IoT non-anchor carrier. The wireless device may be in RRC idle mode. The configuration information may comprise system information broadcast from a network node.

In particular embodiments, the index comprises a PRB index. The PRB index may comprises an absolute PRB index (e.g., integers in a range from −5 to 104). The PRB index may comprises a PRB index relative to the first carrier. The index may include guard band carriers.

According to some embodiments, a network node comprises a broadcasting module and a paging module. The broadcasting module is operable to broadcast configuration information comprising an ARFCN identifying a frequency position of a first carrier, and an index identifying a frequency position of a second carrier relative to the ARFCN of the first carrier. The paging module is operable to page a wireless device using the second carrier.

According to some embodiments, a wireless device comprises a receiving module, a determining module, and a monitoring module. The receiving module is operable to receive configuration information comprising an ARFCN identifying a frequency position of a first carrier, and an index identifying a frequency position of a second carrier relative to the ARFCN of the first carrier. The determining module is operable to determine the frequency position of the second carrier using the frequency position of the first carrier and the index of the second carrier. The monitoring module is operable to monitor the second carrier for paging information.

Also disclosed is a computer program product. The computer program product comprises instructions stored on non-transient computer-readable media which, when executed by a processor, perform the step of broadcasting configuration information comprising an ARFCN identifying a frequency position of a first carrier, and an index identifying a frequency position of a second carrier relative to the ARFCN of the first carrier. The instructions further perform the step of paging a wireless device using the second carrier.

Another computer program product comprises instructions stored on non-transient computer-readable media which, when executed by a processor, perform the step of receiving configuration information comprising an ARFCN identifying a frequency position of a first carrier, and an index identifying a frequency position of a second carrier relative to the ARFCN of the first carrier. The instructions further perform the steps of determining the frequency position of the second carrier using the frequency position of the first carrier and the index of the second carrier; and monitoring the second carrier for paging information.

Particular embodiments may exhibit some of the following technical advantages. For example, one technical advantage is a reduced size system information block (SIB). For example, particular embodiments facilitate a reduction of the large control overhead from system information broadcast on the anchor carrier. A reduced size SIB may enable a Cat-N1 user equipment (UE) to decode the SIB. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
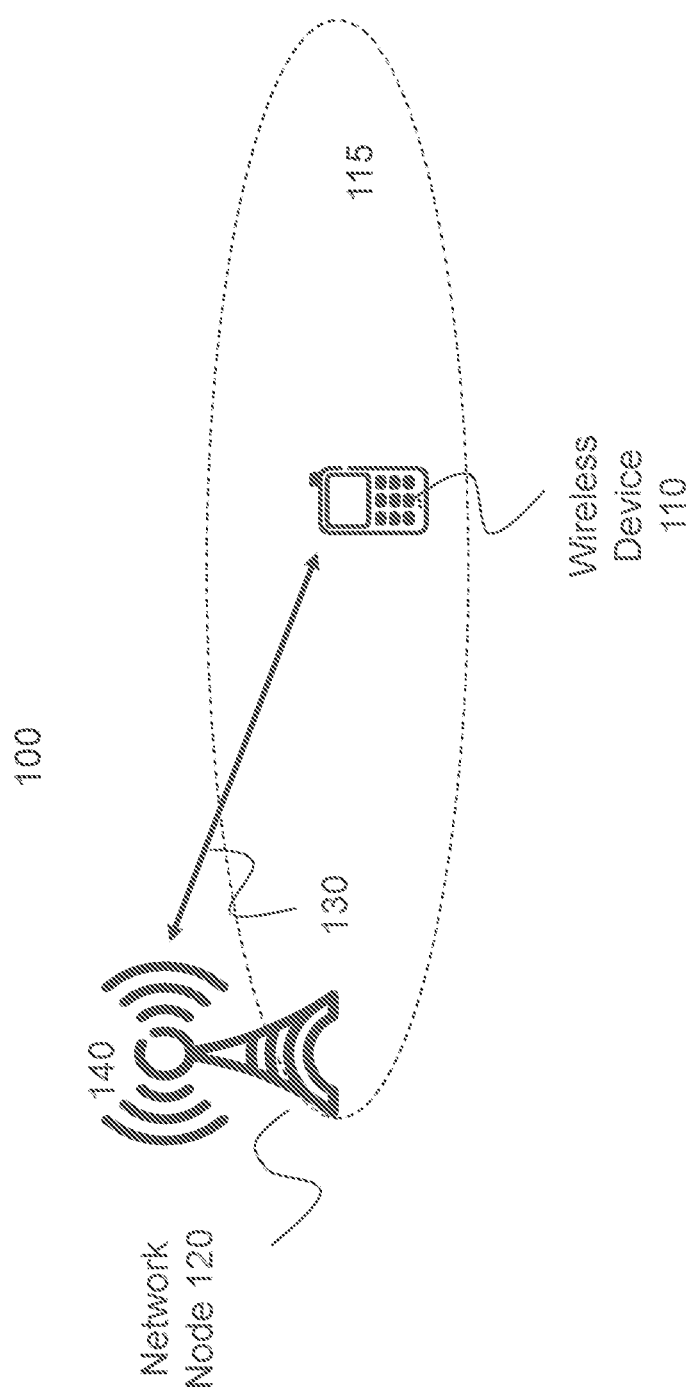
FIG. 1 is a block diagram illustrating an example wireless network, according to some embodiments.

A Third Generation Partnership Project (3GPP) long term evolution (LTE) wireless network may include a narrowband Internet-of-Things (NB-IoT) network. A NB-IoT network may benefit by using additional spectrum. NB-IoT multi-carrier operation includes a user equipment (UE) that that operates in an NB-IoT anchor carrier that is configured through higher layer signaling (e.g., Layer 3 radio resource control (RRC)) to operate in an NB-IoT non-anchor carrier during connected mode operation. The non-anchor carrier does not have to be deployed on the 100-kHz raster (e.g., any LTE in-band PRB can be used as a non-anchor). At the end of connected mode operation, the UE can autonomously return back to the anchor carrier.

LTE Rel-14 may extend multi-carrier operation so that UEs may both monitor paging and perform Random Access on non-anchor carriers. Because a Rel-14 UE in RRC Idle Mode can operate on non-anchor carriers (RA and paging), the configuration is provided by common signaling. A network may broadcast the non-anchor configurations in a new system information block (SIB).

A problem with providing all the non-anchor configurations in a SIB is that the SIB can become too large for UEs to handle. NB-IoT UEs may only be able to support a downlink transport block size of up to 680 bits (e.g., Cat-N1, Rel-14 Cat-N2 may support more).

Particular embodiments obviate the problems described above and include configuring non-anchor carriers without using full frequency position information (i.e., CarrierFreqNB-r13 containing the E-ARFCN plus offset), and using the UE's knowledge of the frequency position of the anchor carrier such that the non-anchor carriers can be configured using a smaller PRB-index, for example. Particular embodiments result in a reduced size SIB. For example, particular embodiments facilitate a reduction of the large control overhead from system information broadcast on the anchor carrier. A reduced size SIB may enable a Cat-N1 UE to decode the SIB.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-6B of the drawings, like numerals being used for like and corresponding parts of the various drawings. LTE is used throughout this disclosure as an example cellular system, but the ideas presented herein may apply to other wireless communication systems as well, such as fifth generation (5G) new radio (NR), or any other suitable communication system.

FIG. 1 is a block diagram illustrating an example wireless network, according to a particular embodiment. Wireless network 100 includes one or more wireless devices 110 (such as mobile phones, smart phones, laptop computers, tablet computers, MTC devices, NB-IoT devices, or any other devices that can provide wireless communication) and a plurality of network nodes 120 (such as base stations, eNodeBs, gNBs, etc.). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

In particular embodiments, wireless device 110 may comprise a NB-IoT device. Wireless device 110 may support multi-carrier operation on a first carrier (e.g., an anchor carrier) and a second carrier (e.g., non-anchor carrier). Wireless device 110 may monitor for paging and/or perform random access on both the anchor and non-anchor carriers.

In particular embodiments, network node 120 broadcasts configuration information comprising an absolute radio frequency channel number (ARFCN) identifying a frequency position of a first carrier, and an index identifying a frequency position of a second carrier. By not including the ARFCN of the second carrier in the broadcast information, the size of the broadcast information is significantly reduced.

Network node 120 may page wireless device 110 using the second carrier. Network node 120 may receiving random access messages from wireless device 110 using the second carrier.

In some embodiments, wireless device 110 receives configuration information (e.g., receives the broadcast SIB from network node 120) comprising an ARFCN identifying a frequency position of a first carrier, and an index identifying a frequency position of a second carrier relative to the ARFCN of the first carrier. Wireless device 110 determines the frequency position of the second carrier using the frequency position of the first carrier (known by the ARFCN) and the index of the second carrier (which is relative to the ARFCN).

In some embodiments, wireless device 110 monitors the second carrier for paging information. Wireless device 110 sends random access messages on the second carrier.

In particular embodiments, the index comprises a PRB index. The PRB index may comprises an absolute PRB index (e.g., integers in a range from −5 to 104). The PRB index may comprises a PRB index relative to the first carrier. The index may include guard band carriers. Particular algorithms for broadcasting and receiving information about the frequency position of a non-anchor carrier are described in more detail with respect to FIGS. 2-4.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 5A below. Similarly, a network node may include any suitable combination of hardware and/or software. For example, in particular embodiments, a network node, such as network node 120, may include the components described with respect to FIG. 6A below.

In LTE, the maximum supported system bandwidth may be 20 MHz, which corresponds to approximately 111 Physical Resource Blocks (PRBs) of 180 kHz. Ten percent of the PRBs may be used as guard-band, and the 100 central PRBs may be used for signal transmission in the LTE system. The central PRBs are indexed from 0 to 99 (the range is set according to 20 MHz, but smaller bandwidths may use a smaller allocation).

For In-band and guard-band deployment, configuring the frequency location of the non-anchor carrier in common broadcasted system information may include the full frequency information (e.g., the E-ARFCN and offset contained in the information element (IE) CarrierFreq-NB-r13), or use of the fact that the frequency position of the anchor carrier is already known to the UE, and also the anchor carrier's frequency position inside the LTE bandwidth, and use only an index (e.g., PRB index, frequency offset, etc.) for the configuration.

The latter case may save signaling bits using an absolute PRB-index (in another embodiment, also the relative distance to the anchor carrier could be indicated but that may require more signaling bits). As mentioned above this may not be applicable to the stand-alone deployment scenario. In another embodiment, only the PRB-index may always be used.

A certain number of guard-band carriers may exist on each side of the LTE band. The PRB-index can be extended to include the guard band but keeping the PRB-indexes the same for the in-band PRBs. The extension may be accomplished by extending the PRB-index to negative values for the guard band on one side because the LTE PRB-index starts at value 0. An example is illustrated in FIG. 2.

Figure 2:
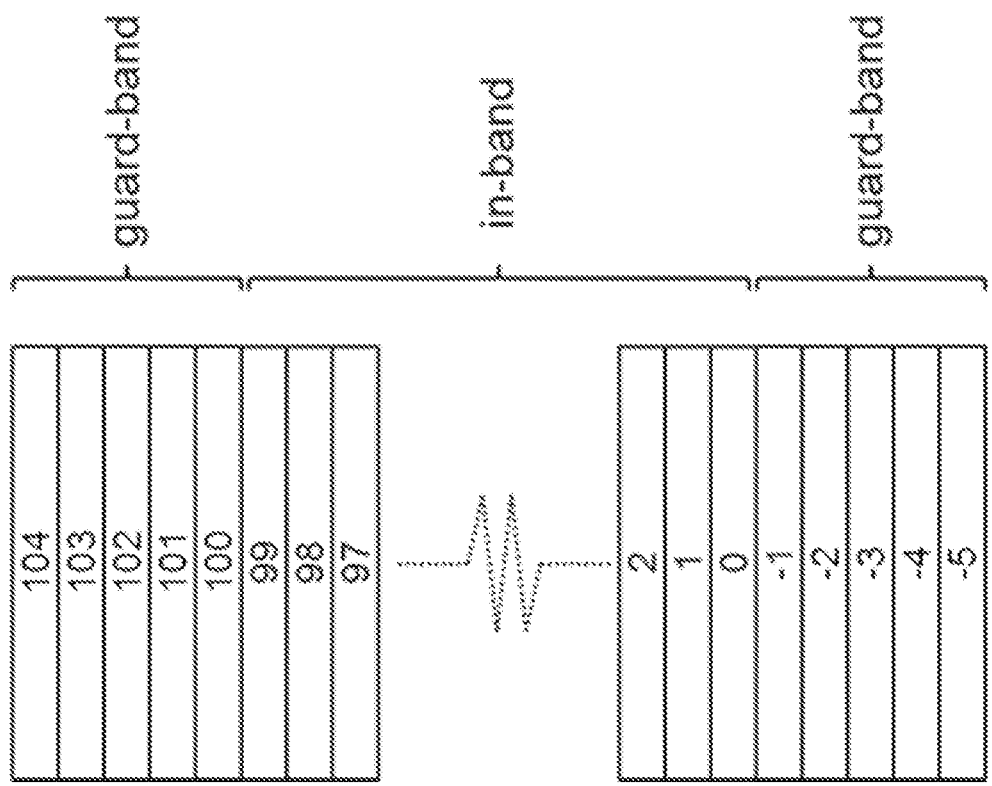
FIG. 2 illustrates an example of a physical resource block (PRB) index for non-anchor carriers in 20 MHz long term evolution (LTE) bandwidth.

FIG. 2 illustrates an example of a PRB index for non-anchor carriers in 20 MHz LTE bandwidth. The vertical axis represents the frequency domain. In the illustrated example, the in-band PRBs are indexed 0 to 99. A first guard band includes the PRBs indexed −5 to −1. A second guard band includes the PRBs indexed 100-104.

NB-IoT may support the following combinations: (a) anchor carrier is in-band, and non-anchor carrier is in-band; (b) anchor carrier is guard-band, and non-anchor carrier is in-band; (c) anchor carrier is in-band, and non-anchor carrier is guard-band; and (d) anchor carrier is guard-band, and non-anchor carrier is guard-band.

This may be expressed as shown in the following ASN.1 text for SystemInformationBlockTypeX-NB-r14 IE from the 3GPP 36.331 specification.

```
-- ASN1START
SystemInformationBlockTypeX-NB-r14 ::= SEQUENCE {
    carrierConfigCommon-r14              CarrierConfigCommon-NB-r14
    OPTIONAL, -- Need OR
    ...
}
CarrierConfigCommon-NB-r14 ::=   SEQUENCE {
    dl-CarrierConfig-r14   SEQUENCE (SIZE (1.. maxNonAnchorCarriers-NB-r14)) OF
                                                                      DL-
CarrierConfigCommon-NB-r14 OPTIONAL, -- Need OR
    ul-CarrierConfig-r14   SEQUENCE (SIZE (1.. maxNonAnchorCarriers-NB-r14)) OF
                                                                      UL-
CarrierConfigCommon-NB-r14 OPTIONAL, -- Need OR
    ...
}
DL-CarrierConfigCommon-NB-r14 ::=          SEQUENCE {
    dl-CarrierInfo-r14                              CHOICE {
        dl-CarrierFreq-r14                                  CarrierFreq-NB-
r13,
        indexToDlAnchorPRB-r14                       INTEGER (-
5..104)
    }
    downlinkBitmapNonAnchor-r14                    CHOICE {
```

```
        useNoBitmap-r14                               NULL,
        useAnchorBitmap-r14                   NULL,
        explicitBitmapConfiguration-r14       DL-Bitmap-NB-r13,
        spare                                         NULL
    }           OPTIONAL,    -- Need ON
    dl-GapNonAnchor-r14                       CHOICE {
        useNoGap-r14                          NULL,
        useAnchorGapConfig-r14                NULL,
        explicitGapConfiguration-r14          DL-GapConfig-NB-r13,
        spare                                         NULL
    }           OPTIONAL,    -- Need ON
    inbandCarrierInfo-r14             SEQUENCE {
        samePCI-Indicator-r14             CHOICE {
            samePCI-r14                           SEQUENCE {
            indexToMidPRB-r14                     INTEGER (-
55..54)
            },
            differentPCI-r14                  SEQUENCE {
            eutra-NumCRS-Ports-r14                ENUMERATED
{same, four}
            }
        }
        OPTIONAL,        -- Cond anchor-guardband
        eutraControlRegionSize-r14              ENUMERATED {n1, n2, n3}
    }
        OPTIONAL,        -- Cond non-anchor-inband
    nrs-PowerOffsetNonAnchor-r14      ENUMERATED {dB-12, dB-10, dB-8,
dB-6,
                                                                dB-4, dB-
2, dB0, dB3}      OPTIONAL      -- Need OP
    ...
}
UL-CarrierConfigCommon-NB-r14 ::=         SEQUENCE {
    ul-CarrierInfo-r14                        CHOICE {
        ul-CarrierFreq-r14                            CarrierFreq-NB-
r13
        indexToUlAnchorPRB-r14                    INTEGER (-
5..104)
    }           OPTIONAL,    -- Need OP
    ...
}
-- ASN1STOP
```

An advantage of particular embodiments is that the resulting SIB size is small enough such that a) the SIB is decodable for Cat-NI UEs, and b) there is a reduction of the already large control overhead from system information broadcast on the anchor carrier.

Particular embodiments may include methods in a network node and a wireless device. The examples and embodiments described above may be generally represented by the flowcharts in FIGS. 3 and 4.

Figure 3:
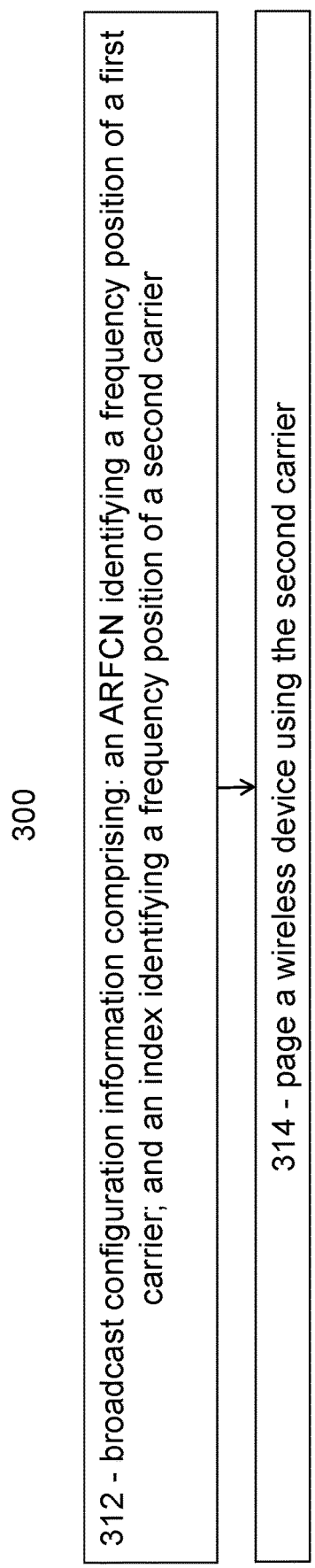
FIG. 3 is a flow diagram illustrating an example method in a network node, according to some embodiments.

FIG. 3 is a flow diagram illustrating an example method in a network node, according to some embodiments. In particular embodiments, one or more steps of FIG. 3 may be performed by network node 120 of wireless network 100 described with respect to FIG. 1.

The method begins at step 312, where the network node broadcasts configuration information. The configuration information comprises an ARFCN identifying a frequency position of a first carrier, and an index identifying a frequency position of a second carrier relative to the ARFCN of the first carrier. For example, network node 120 may broadcast a SIB containing the configuration information to wireless device 110.

In particular embodiments, wireless device 110 comprises a NB-IoT device, the first carrier comprises a NB-IoT anchor carrier, and the second carrier comprises a NB-IoT non-anchor carrier. The wireless device may be in RRC idle mode.

The configuration information identifies the frequency position of the first and second carriers. However, an advantage of particular embodiments is that the configuration information need not include a complete ARFCN for both first and second carriers. The first carrier may be specified by the a complete ARFCN, and the second carrier may be specified by an index (e.g., absolute PRB index, relative PRB index, frequency offset, etc.) relative to the frequency position of the first carrier.

For example, the ARFCN of the first carrier may specify a particular 20 MHz bandwidth (or other suitable size) and a carrier within that bandwidth. Because the particular 20 MHz bandwidth (or other suitable size) is known, and the second carrier is within the same bandwidth range as the first carrier, then the frequency of the second carrier may be specified relative to the first carrier, without the need for a complete ARFCN.

At step 314, the network node pages a wireless device using the second carrier. For example, network node 120 may page wireless device 110 on the second carrier (e.g., non-anchor carrier). Network node 120 may also monitor the second carrier (e.g., non-anchor carrier) for random access messages from wireless device 110.

Modifications, additions, or omissions may be made to method 300. Additionally, one or more steps in method 300 of FIG. 3 may be performed in parallel or in any suitable order. The steps of method 300 may be repeated over time as necessary.

Figure 4:
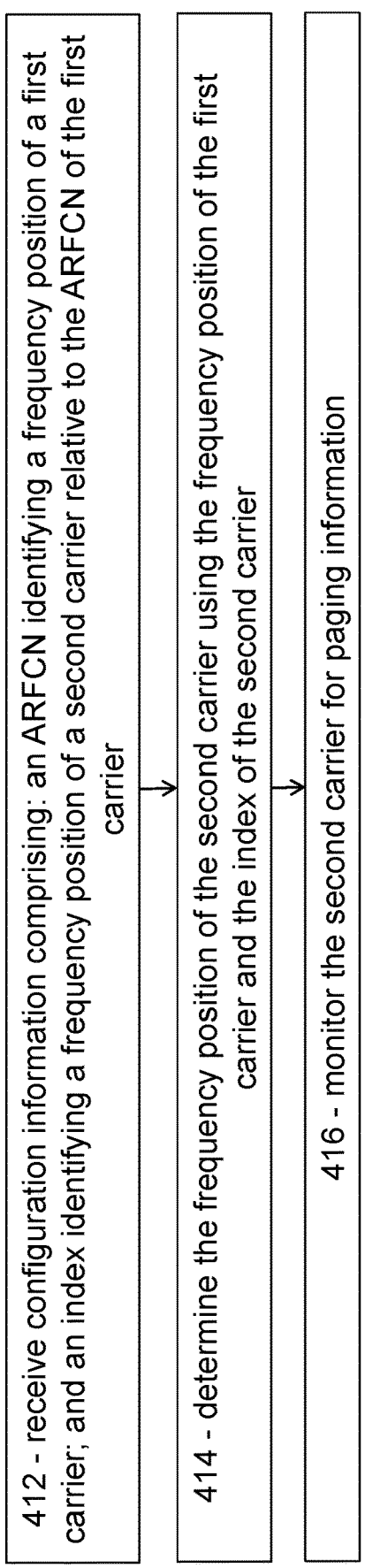
FIG. 4 is a flow diagram illustrating an example method in a wireless device, according to some embodiments.

FIG. 4 is a flow diagram illustrating an example method in a wireless device, according to some embodiments. In particular embodiments, one or more steps of FIG. 4 may be performed by wireless device 110 of wireless network 100 described with respect to FIG. 1.

The method begins at step 412, where the wireless device receives configuration information comprising an ARFCN identifying a frequency position of a first carrier, and an index identifying a frequency position of a second carrier relative to the ARFCN of the first carrier. For example, wireless device 110 may receive a SIB broadcasted from network node 120.

In particular embodiments, wireless device 110 comprises a NB-IoT device, the first carrier comprises a NB-IoT anchor carrier, and the second carrier comprises a NB-IoT non-anchor carrier. The wireless device may be in RRC idle mode.

The configuration information identifies the frequency position of the first and second carriers. However, an advantage of particular embodiments is that the configuration information need not include a complete ARFCN for both first and second carriers. The first carrier may be specified by the a complete ARFCN, and the second carrier may be specified by an index (e.g., absolute PRB index, relative PRB index, frequency offset, etc.) relative to the frequency position of the first carrier.

For example, the ARFCN of the first carrier may specify a particular 20 MHz bandwidth (or other suitable size) and a carrier within that bandwidth. Because the particular 20 MHz bandwidth (or other suitable size) is known, and the second carrier is within the same bandwidth range as the first carrier, then the frequency of the second carrier may be specified relative to the first carrier, without the need for a complete ARFCN.

At step 414, the wireless device determines the frequency position of the second carrier using the frequency position of the first carrier and the index of the second carrier. For example, wireless device 110 knows the frequency position of the first carrier based on the ARFCN. If the received index for the second carrier is an absolute PRB index (e.g., −5 to 104), then wireless device 110 determines that the frequency position of the second carrier is at the received absolute PRB index in the same bandwidth as the first carrier. If the received index for the second carrier is relative PRB index (e.g., plus or minus a particular number of PRBs), then wireless device 110 determines that the frequency position of the second carrier is plus or minus the particular number of PRBs from the first carrier.

At step 416, the wireless device monitors the second carrier for paging information. For example, wireless device 110 may monitor the second carrier (e.g., non-anchor carrier) for paging information from network node 120. Wireless device 110 may send random access messages to network node 120 using the second carrier (e.g., non-anchor carrier).

Modifications, additions, or omissions may be made to method 400. Additionally, one or more steps in method 400 of FIG. 4 may be performed in parallel or in any suitable order. The steps of method 400 may be repeated over time as necessary.

Figure 5B:
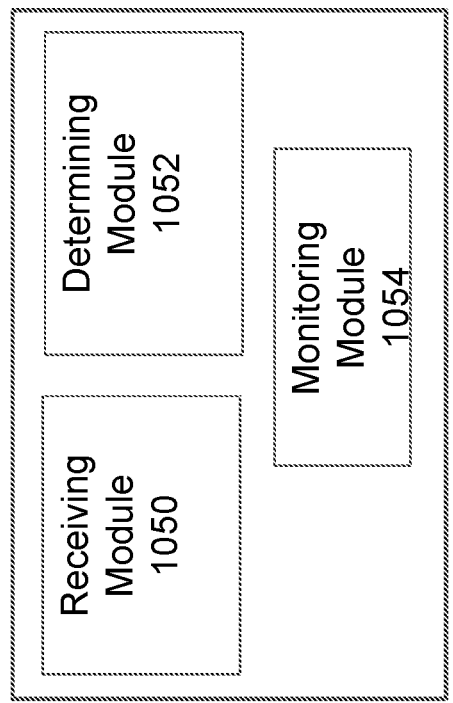
FIG. 5B is a block diagram illustrating example components of a wireless device.
Figure 5A:
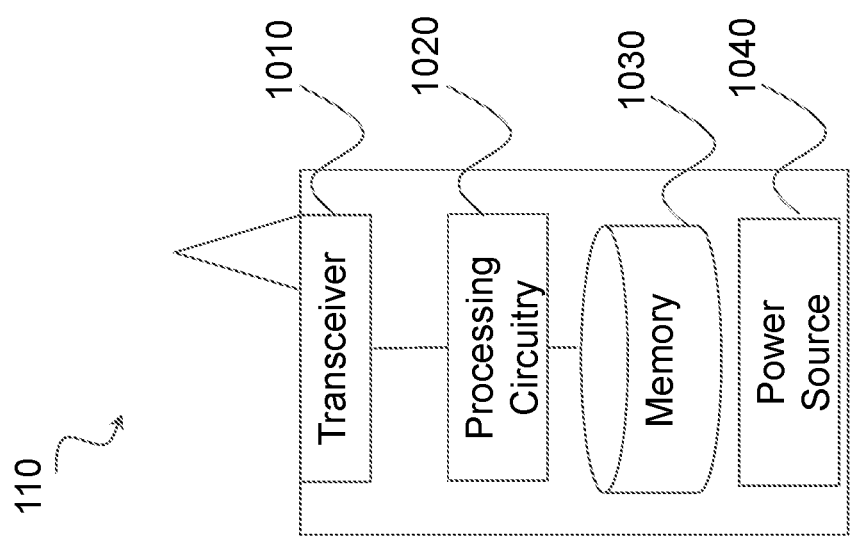
FIG. 5A is a block diagram illustrating an example embodiment of a wireless device.

FIG. 5A is a block diagram illustrating an example embodiment of a wireless device. The wireless device is an example of the wireless devices 110 illustrated in FIG. 1. In particular embodiments, the wireless device is capable of receiving configuration information that includes frequency position information for a first carrier and a second carrier, such as a NB-IoT anchor-carrier and non-anchor carrier. The wireless device may receive paging and perform random access on both the first carrier and the second carrier.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, NB-IoT device, laptop embedded equipment (LEE), laptop mounted equipment (LME), USB dongles, a device-to-device capable device, a vehicle-to-vehicle device, or any other device that can provide wireless communication. The wireless device includes transceiver 1010, processing circuitry 1020, memory 1030, and power source 1040. In some embodiments, transceiver 1010 facilitates transmitting wireless signals to and receiving wireless signals from wireless network node 120 (e.g., via an antenna), processing circuitry 1020 executes instructions to provide some or all of the functionality described herein as provided by the wireless device, and memory 1030 stores the instructions executed by processing circuitry 1020. Power source 1040 supplies electrical power to one or more of the components of wireless device 110, such as transceiver 1010, processing circuitry 1020, and/or memory 1030.

Processing circuitry 1020 includes any suitable combination of hardware and software implemented in one or more integrated circuits or modules to execute instructions and manipulate data to perform some or all of the described functions of the wireless device. In some embodiments, processing circuitry 1020 may include, for example, one or more computers, one more programmable logic devices, one or more central processing units (CPUs), one or more microprocessors, one or more applications, and/or other logic, and/or any suitable combination of the preceding. Processing circuitry 1020 may include analog and/or digital circuitry configured to perform some or all of the described functions of wireless device 110. For example, processing circuitry 1020 may include resistors, capacitors, inductors, transistors, diodes, and/or any other suitable circuit components.

Memory 1030 is generally operable to store computer executable code and data. Examples of memory 1030 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1040 is generally operable to supply electrical power to the components of wireless device 110. Power source 1040 may include any suitable type of battery, such as lithium-ion, lithium-air, lithium polymer, nickel cadmium, nickel metal hydride, or any other suitable type of battery for supplying power to a wireless device. In particular embodiments, processing circuitry 1020 in communication with transceiver 1010 receives configuration information that includes frequency position information for a first carrier and a second carrier, such as a NB-IoT anchor-carrier and non-anchor carrier.

Other embodiments of the wireless device may include additional components (beyond those shown in FIG. 10A) responsible for providing certain aspects of the wireless device's functionality, including any of the functionality described above and/or any additional functionality (including any functionality necessary to support the solution described above).

FIG. 10B is a block diagram illustrating example components of a wireless device 110. The components may include receiving module 1050, determining module 1052, and monitoring module 1054.

Receiving module 1050 may perform the receiving functions of wireless device 110. For example, receiving module 1050 may receive configuration information comprising an ARFCN identifying a frequency position of a first carrier, and an index identifying a frequency position of a second carrier relative to the ARFCN of the first carrier, according to any of the embodiments and examples described above (e.g., step 412 of FIG. 4). In certain embodiments, receiving module 1050 may include or be included in processing circuitry 1020. In particular embodiments, receiving module 1050 may communicate with Determining module 1052 and monitoring module 1054.

Determining module 1052 may perform the determining functions of wireless device 110. For example, determining module 1052 may determine a frequency position of the second carrier using the frequency position of the first carrier and the index of the second carrier, according to any of the embodiments and examples described above (e.g., step 414 of FIG. 4). In certain embodiments, determining module 1052 may include or be included in processing circuitry 1020. In particular embodiments, determining module 1052 may communicate with receiving module 1050 and monitoring module 1054.

Monitoring module 1054 may perform the monitoring functions of wireless device 110. For example, monitoring module 1054 may monitor the second channel for paging information, according to any of the embodiments and examples described above (e.g., step 416 of FIG. 4). In certain embodiments, monitoring module 1054 may include or be included in processing circuitry 1020. In particular embodiments, monitoring module 1054 may communicate with receiving module 1050 and determining module 1052.

Figure 6B:
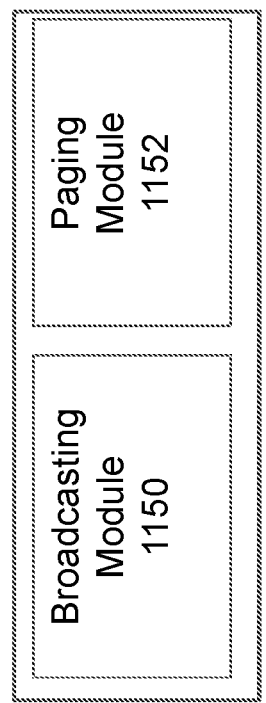
FIG. 6B is a block diagram illustrating example components of a network node.
Figure 6A:
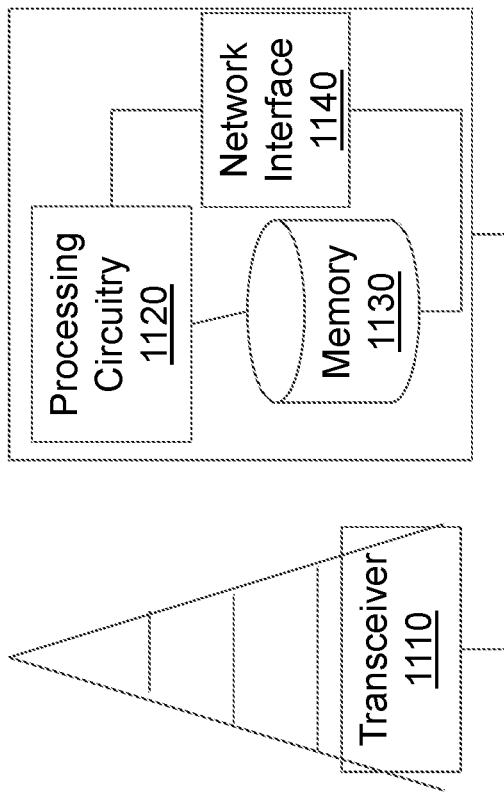
FIG. 6A is a block diagram illustrating an example embodiment of a network node.

FIG. 6A is a block diagram illustrating an example embodiment of a network node. The network node is an example of the network node 120 illustrated in FIG. 1. In particular embodiments, the network node is capable of broadcasting configuration information that includes frequency position information for a first carrier and a second carrier, such as a NB-IoT anchor-carrier and non-anchor carrier.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1110, processing circuitry 1120, at least one memory 1130, and at least one network interface 1140. Transceiver 1110 facilitates transmitting wireless signals to and receiving wireless signals from a wireless device, such as wireless devices 110 (e.g., via an antenna); processing circuitry 1120 executes instructions to provide some or all of the functionality described above as being provided by a network node 120; memory 1130 stores the instructions executed by processing circuitry 1120; and network interface 1140 communicates signals to backend network components, such as a gateway, switch, router, Internet, Public Switched Telephone Network (PSTN), controller, and/or other network nodes 120. Processing circuitry 1120 and memory 1130 can be of the same types as described with respect to processing circuitry 1020 and memory 1030 of FIG. 5A above.

In some embodiments, network interface 1140 is communicatively coupled to processing circuitry 1120 and refers to any suitable device operable to receive input for network node 120, send output from network node 120, perform suitable processing of the input or output or both, communicate to other devices, or any combination of the preceding. Network interface 1140 includes appropriate hardware (e.g., port, modem, network interface card, etc.) and software, including protocol conversion and data processing capabilities, to communicate through a network. In particular embodiments, processing circuitry 1120 in communication with transceiver 1110 broadcasts configuration information that includes frequency position information for a first carrier and a second carrier, such as a NB-IoT anchor-carrier and non-anchor carrier.

Other embodiments of network node 120 include additional components (beyond those shown in FIG. 6A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 6B is a block diagram illustrating example components of a network node 120. The components may include broadcasting module 1150 and paging module 1152.

Broadcasting module 1150 may perform the broadcasting functions of network node 120. For example, broadcasting module 1150 may broadcast configuration information comprising: an ARFCN identifying a frequency position of a first carrier, and an index identifying a frequency position of a second carrier, according to any of the embodiments and examples described above (e.g., step 312 of FIG. 3). In certain embodiments, broadcasting module 1150 may include or be included in processing circuitry 1120. In particular embodiments, broadcasting module 1150 may communicate with paging module 1152.

Paging module 1152 may perform the paging functions of network node 120. For example, paging module 1152 may page a wireless device on the second carrier according to any of the embodiments described with respect to FIGS. 3 and 4. In certain embodiments, paging module 1152 may include or be included in processing circuitry 1120. In particular embodiments, paging module 1152 may communicate with broadcasting module 1150.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
ACK Acknowledgement
BLER Block Error Rate
BTS Base Transceiver Station
CRC Cyclic Redundancy Check
CRS Cell Reference Symbols
CSI Channel State Information
D2D Device to Device
DCI Downlink Control Information
DL Downlink
DMRS Demodulation Reference Signal
ePDCCH enhanced Physical Downlink Control Channel
eNB eNodeB
FDD Frequency Division Duplex
HARQ Hybrid Automatic Repeat Request
LTE Long Term Evolution
M2M Machine to Machine
MAC Medium Access Control
MBSFN Multimedia Broadcast Single Frequency Network
MCS Modulation and Coding Scheme
MIB Master Information Block
MIMO Multi-Input Multi-Output
MTC Machine Type Communication
NAK Negative Acknowledgement
NB Narrowband
NB-IoT Narrowband Internet of Things
NDLSCH NB Downlink Shared Channel
NPBCH NB Physical Broadcast Channel
NPRACH NB Physical Random Access Channel
NPSS NB Primary Synchronization Signal
NR New Radio
NRS NB Reference Symbols
NSSS NB Secondary Synchronization Signal
NW Network
OFDM Orthogonal Frequency Division Multiplex
PDCCH Physical Downlink Control Channel
PDSCH Physical Downlink Shared Channel
PF Paging Frame
PO Paging Occasion
PRB Physical Resource Block
PUCCH Physical Uplink Control Channel
PUSCH Physical Uplink Shared Channel
RAN Radio Access Network
RAT Radio Access Technology
RB Resource Block
RBS Radio Base Station
RE Resource Element
RI Rank Index
RNC Radio Network Controller
RRC Radio Resource Control
RRH Remote Radio Head
RRU Remote Radio Unit
RS Reference Signal
SC-FDMA Single Carrier-Frequency Division Multiple Access
SI System Information
SIB System Information Block
sTTI Shortened TTI
TDD Time Division Duplex
TTI Transmission Time Interval
UCI Uplink Control Information
UE User Equipment
UL Uplink
UTRAN Universal Terrestrial Radio Access Network
WAN Wireless Access Network

The invention claimed is:

1. A method in a network node in a wireless communication system, the method comprising:
broadcasting configuration information comprising:
an absolute radio frequency channel number (ARFCN) identifying a frequency position of a first carrier;
an index identifying a frequency position of a second carrier relative to the ARFCN of the first carrier, wherein the index identifying the frequency position of the second carrier is not an ARFCN; and
paging a wireless device using the second carrier.

2. A network node comprising processing circuitry, the processing circuitry operable to:
broadcast configuration information comprising:
an absolute radio frequency channel number (ARFCN) identifying a frequency position of a first carrier;
an index identifying a frequency position of a second carrier relative to the ARFCN of the first carrier, wherein the index identifying the frequency position of the second carrier is not an ARFCN; and
page a wireless device using the second carrier.

3. The network node of claim 2, wherein the wireless device comprises a narrowband Internet-of-Things (NB-IoT) device, the first carrier comprises a NB-IoT anchor carrier, and the second carrier comprises a NB-IoT non-anchor carrier.

4. The network node of claim 1, wherein the configuration information comprises system information.

5. The network node of claim 1, wherein the index comprises a physical resource block (PRB) index.

6. The network node of claim 5, wherein the PRB index comprises an absolute PRB index.

7. The network node of claim 6, wherein the PRB index comprises integers in a range from −5 to 104.

8. The network node of claim 5, wherein the PRB index comprises a PRB index relative to the first carrier.

9. The network node of claim 1, wherein the index includes guard band carriers.

10. The network node of claim 1, wherein the wireless device is in radio resource control (RRC) idle mode.

11. A method in a wireless device in a wireless communication system, the method comprising:
receiving configuration information comprising:
an absolute radio frequency channel number (ARFCN) identifying a frequency position of a first carrier;
an index identifying a frequency position of a second carrier relative to the ARFCN of the first carrier, wherein the index identifying the frequency position of the second carrier is not an ARFCN;
determining the frequency position of the second carrier using the frequency position of the first carrier and the index of the second carrier; and
monitoring the second carrier for paging information.

12. The method of claim 11, wherein the wireless device comprises a narrowband Internet-of-Things (NB-IoT) device, the first carrier comprises a NB-IoT anchor carrier, and the second carrier comprises a NB-IoT non-anchor carrier.

13. The method of claim 11, wherein the configuration information comprises system information broadcast from a network node.

14. The method of claim 11, wherein the index comprises a physical resource block (PRB) index.

15. The method of claim 14, wherein the PRB index comprises an absolute PRB index.

16. The method of claim 15, wherein the PRB index comprises integers in a range from −5 to 104.

17. The method of claim 14, wherein the PRB index comprises a PRB index relative to the first carrier.

18. A wireless device comprising processing circuitry, the processing circuitry operable to:
- receive configuration information comprising:
  - an absolute radio frequency channel number (ARFCN) identifying a frequency position of a first carrier;
  - an index identifying a frequency position of a second carrier relative to the ARFCN of the first carrier, wherein the index identifying the frequency position of the second carrier is not an ARFCN;
- determine the frequency position of the second carrier using the frequency position of the first carrier and the index of the second carrier; and
- monitor the second carrier for paging information.

19. The wireless device of claim 18, wherein the wireless device comprises a narrowband Internet-of-Things (NB-IoT) device, the first carrier comprises a NB-IoT anchor carrier, and the second carrier comprises a NB-IoT non-anchor carrier.

20. The wireless device of claim 18, wherein the configuration information comprises system information broadcast from a network node.

21. The wireless device of claim 18, wherein the index comprises a physical resource block (PRB) index.

22. The wireless device of claim 21, wherein the PRB index comprises an absolute PRB index.

23. The wireless device of claim 21, wherein the PRB index comprises integers in a range from −5 to 104.

24. The wireless device of claim 21, wherein the PRB index comprises a PRB index relative to the first carrier.

25. The wireless device of claim 18, wherein the index includes guard band carriers.

26. The wireless device of claim 18, wherein the wireless device is in radio resource control (RRC) idle mode.

* * * * *